United States Patent
Trundle

(10) Patent No.: US 12,067,094 B2
(45) Date of Patent: *Aug. 20, 2024

(54) PIN VERIFICATION

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 687 days.

This patent is subject to a terminal disclaimer.

(21) Appl. No.: 17/208,738

(22) Filed: Mar. 22, 2021

(65) Prior Publication Data

US 2021/0209211 A1    Jul. 8, 2021

Related U.S. Application Data

(63) Continuation of application No. 15/815,863, filed on Nov. 17, 2017, now Pat. No. 10,956,545.

(60) Provisional application No. 62/423,330, filed on Nov. 17, 2016.

(51) Int. Cl.
*G06F 21/32* (2013.01)
*G06F 21/31* (2013.01)
*G06F 21/40* (2013.01)
*G06F 21/50* (2013.01)

(52) U.S. Cl.
CPC ............ *G06F 21/32* (2013.01); *G06F 21/316* (2013.01); *G06F 21/40* (2013.01); *G06F 21/50* (2013.01)

(58) Field of Classification Search
CPC ........ G06F 21/32; G06F 21/316; G06F 21/40; G06F 21/50; G06F 21/31; G06F 21/30
See application file for complete search history.

(56) References Cited

U.S. PATENT DOCUMENTS

| | | | |
|---|---|---|---|
| 6,812,836 B2 * | 11/2004 | Soloway | G08B 25/008 70/432 |
| 6,871,287 B1 | 3/2005 | Ellingson | |
| 7,116,211 B1 | 10/2006 | Parker | |
| 7,183,894 B2 | 2/2007 | Yui et al. | |
| 8,520,072 B1 * | 8/2013 | Slavin | G08B 13/19684 348/143 |
| 9,064,394 B1 * | 6/2015 | Trundle | G08B 13/19684 |

(Continued)

*Primary Examiner* — Oleg Korsak
(74) *Attorney, Agent, or Firm* — Fish & Richardson P.C.

(57) ABSTRACT

A monitoring system is disclosed. The monitoring system includes a monitoring server that is configured to receive a personally identifying code from a visitor to a property monitored by the monitoring system. The monitoring system includes one or more sensors that transmit sensor data to the monitoring server and that are configured to capture a biometric identifier from the visitor to the property monitored by the monitoring system. The monitoring system is configured to compare the received personally identifying code to a stored personally identifying code. The monitoring system is configured to compare the received biometric identifier to a stored biometric identifier. The monitoring system is configured to determine a likelihood that the visitor is the known person. The monitoring system is configured to determine that the likelihood that the visitor is the known person does not satisfy a threshold. The monitoring system is configured to generate an alarm condition.

20 Claims, 5 Drawing Sheets

(56) References Cited

U.S. PATENT DOCUMENTS

| | | |
|---|---|---|
| 9,141,150 B1 | 9/2015 | Trundle et al. |
| 9,426,139 B1 | 8/2016 | McClintock et al. |
| 9,558,639 B2 * | 1/2017 | Modi .................. G08B 25/008 |
| 9,734,697 B1 | 8/2017 | Modi et al. |
| 10,249,069 B1 | 4/2019 | Kerzner et al. |
| 10,354,517 B1 | 7/2019 | King |
| 2005/0273333 A1 | 12/2005 | Morin et al. |
| 2006/0226951 A1 | 10/2006 | Aull et al. |
| 2007/0198850 A1 * | 8/2007 | Martin .................. G07C 9/257 |
| | | 713/186 |
| 2007/0273474 A1 | 11/2007 | Levine |
| 2008/0317294 A1 | 12/2008 | Hashimoto |
| 2009/0031633 A1 | 2/2009 | Kiyonnasa et al. |
| 2010/0052851 A1 | 3/2010 | Kaehler |
| 2010/0162386 A1 | 6/2010 | Li et al. |
| 2012/0019379 A1 | 1/2012 | Ben Ayed |
| 2013/0017812 A1 * | 1/2013 | Foster ................ H04L 12/2825 |
| | | 340/5.7 |
| 2013/0198826 A1 | 8/2013 | Waldron |
| 2014/0118109 A1 | 5/2014 | Plummer |
| 2014/0139678 A1 | 5/2014 | Moriarty et al. |
| 2014/0210590 A1 | 7/2014 | Castro et al. |
| 2014/0253285 A1 | 9/2014 | Menzel |
| 2015/0081295 A1 * | 3/2015 | Yun .......................... G10L 17/24 |
| | | 704/244 |
| 2015/0109112 A1 | 4/2015 | Fadell et al. |
| 2015/0154850 A1 * | 6/2015 | Fadell .................. G06Q 10/083 |
| | | 340/501 |
| 2015/0227734 A1 | 8/2015 | Mucci et al. |
| 2015/0310444 A1 | 10/2015 | Chen et al. |
| 2015/0339870 A1 | 11/2015 | Cojocaru et al. |
| 2016/0049071 A1 | 2/2016 | Beaver et al. |
| 2016/0117917 A1 * | 4/2016 | Prakash .................. G08B 29/12 |
| | | 340/514 |
| 2016/0219046 A1 | 7/2016 | Ballard et al. |
| 2017/0213447 A1 | 7/2017 | Horrocks et al. |
| 2017/0243225 A1 | 8/2017 | Kohli |
| 2017/0249451 A1 | 8/2017 | Andreeva |
| 2017/0282856 A1 | 10/2017 | Riedel et al. |
| 2018/0012460 A1 | 1/2018 | Heitz, III et al. |
| 2018/0075450 A1 | 3/2018 | Hurry |
| 2018/0096569 A1 | 4/2018 | Eaton |
| 2018/0296136 A1 | 10/2018 | Foxlin et al. |

* cited by examiner

PIN VERIFICATION

CROSS REFERENCE TO RELATED APPLICATIONS

This application is a continuation of U.S. application Ser. No. 15/815,863, filed Nov. 17, 2017, now allowed, which claims the benefit of U.S. Provisional Application No. 62/423,330, filed Nov. 17, 2016, and titled "Pin Verification." The complete disclosures of all of the above patent applications are hereby incorporated by reference in their entirety for all purposes.

TECHNICAL FIELD

This disclosure relates to monitoring technology and, for example, maintaining PIN or login integrity through the use of biometrics data associated with users at a monitored property.

BACKGROUND

Many people equip homes and businesses with monitoring systems to provide increased security for their homes and businesses. Over a period of time the integrity of the PIN or login information used to disarm these monitoring systems may be degraded with the increase of the distribution of this information.

SUMMARY

Techniques are described for monitoring technology. For example, techniques are described for maintaining PIN or login integrity.

According to an innovative aspect of the subject matter described in this application, a monitoring system includes a monitoring server, with at least one processor, that is configured to receive a personally identifying code from a visitor to a property monitored by the monitoring system; and one or more sensors that transmit sensor data to the monitoring server and that are configured to capture a biometric identifier from the visitor to the property monitored by the monitoring system. The monitoring server is further configured to compare the received personally identifying code to a stored personally identifying code; compare the received biometric identifier to a stored biometric identifier that corresponds to a known person; based on comparing the received personally identifying code to the stored personally identifying code, determine that the received personally identifying code matches the stored personally identifying code; based on comparing the received biometric identifier to the stored biometric identifier, determine a likelihood that the visitor is the known person; determine that the likelihood that the visitor is the known person does not satisfy a threshold; and generate an alarm condition based on determining that the likelihood that the visitor is the known person does not satisfy a threshold and based on determining that the received personally identifying code matches the stored personally identifying code.

These and other implementations each optionally include one or more of the following optional features. The action of determining a likelihood that the visitor is the known person includes determining a confidence score that reflects the likelihood that the visitor is the known person. The action of determining that the likelihood that the visitor is the known person does not satisfy a threshold includes determining that the confidence score does not satisfy a threshold confidence score. The monitoring server is further configured to, in response to receiving the personally identifying code, generate a prompt for the biometric identifier; and provide, for output, the prompt for the biometric identifier. The monitoring server is further configured to, in response to receiving the personally identifying code, automatically capture the biometric identifier. The monitoring server is further configured to determine that an armed status of the monitoring system is armed-away. The action of generating the alarm condition includes generating an audible alarm at the property. The monitoring server is further configured to determine that an armed status of the monitoring system is armed-stay. The action of generating the alarm condition includes transmitting a notification to a computing device of a resident of the property. The monitoring server is further configured to delete the stored personally identifying code from storage based on determining that the biometric identifier does not match the stored biometric identifier.

The monitoring server is further configured to receive, from the known person, a request to configure a given personally identifying code; in response to the request to configure the stored personally identifying code, generate a prompt for the given personally identifying code; provide, for output, the prompt for the given personally identifying code; receive, from the known person, the given personally identifying code; compare the given personally identifying code to one or more stored personally identifying codes; determine that the given personally identifying code does not match at least one of the one or more stored personally identifying codes; based on determining that the given personally identifying code does not match at least one of the one or more stored personally identifying codes, store, for the known person, the given personally identifying code as the stored personally identifying code; generate a prompt for a given biometric identifier; provide, for output, the prompt for the given biometric identifier; receive the given biometric identifier; and store, for the known person, the given biometric identifier as the stored biometric identifier. The monitoring server is further configured to generate an additional prompt for an additional given biometric identifier; provide, for output, the additional prompt for the additional given biometric identifier; receive the additional given biometric identifier; and store, for the known person, the additional given biometric identifier as an additional stored biometric identifier.

According to another innovative aspect of the subject matter described in this application, a method for validating a personally identifiable code includes the actions of receiving, by an armed monitoring system of a property and from a visitor to the property, a personally identifying code and a biometric identifier; comparing the received personally identifying code to a stored personally identifying code; comparing the received biometric identifier to a stored biometric identifier that corresponds to a known person; based on comparing the received personally identifying code to the stored personally identifying code, determining that the received personally identifying code matches the stored personally identifying code; based on comparing the received biometric identifier to the stored biometric identifier, determining a likelihood that the visitor is the known person; determining that the likelihood that the visitor is the known person does not satisfy a threshold; and generating, by the armed monitoring system, an alarm condition based on determining that the likelihood that the visitor is the known person does not satisfy a threshold and based on determining that the received personally identifying code matches the stored personally identifying code.

These and other implementations can each optionally include one or more of the following features. The action of determining a likelihood that the visitor is the known person includes determining a confidence score that reflects the likelihood that the visitor is the known person. The action of determining that the likelihood that the visitor is the known person does not satisfy a threshold includes determining that the confidence score does not satisfy a threshold confidence score. The actions further include, in response to receiving the personally identifying code, generating a prompt for the biometric identifier; and providing, for output, the prompt for the biometric identifier. The actions further include, in response to receiving the personally identifying code, automatically capturing the biometric identifier. The actions further include determining that an armed status of the monitoring system is armed-away. The action of generating the alarm condition includes generating an audible alarm at the property based on determining that the armed status of the monitoring system is armed-away. The actions further include determining that an armed status of the monitoring system is armed-stay. The action of generating the alarm condition includes transmitting a notification to a computing device of a resident of the property based on determining that the armed status of the monitoring system is armed-stay. The actions further include deleting the stored personally identifying code from storage based on determining that the biometric identifier does not match the stored biometric identifier.

The actions further include receiving, from the known person, a request to configure a given personally identifying code; in response to the request to configure the stored personally identifying code, generating a prompt for the given personally identifying code; providing, for output, the prompt for the given personally identifying code; receiving, from the known person, the given personally identifying code; comparing the given personally identifying code to one or more stored personally identifying codes; determining that the given personally identifying code does not match at least one of the one or more stored personally identifying codes; based on determining that the given personally identifying code does not match at least one of the one or more stored personally identifying codes, storing, for the known person, the given personally identifying code as the stored personally identifying code; generating a prompt for a given biometric identifier; providing, for output, the prompt for the given biometric identifier; receiving the given biometric identifier; and storing, for the known person, the given biometric identifier as the stored biometric identifier. The actions further include generating an additional prompt for an additional given biometric identifier; providing, for output, the additional prompt for the additional given biometric identifier; receiving the additional given biometric identifier; and storing, for the known person, the additional given biometric identifier as an additional stored biometric identifier.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for maintaining PIN or login integrity at a monitored property. For example, the monitoring system may require a PIN or login information match along with a biometrics confirmation to authorize a request to arm or disarm the system. The monitoring system may be configured to verify the identity of the user entering a PIN or login information based on identifying a match between biometrics information captured at the time the user enters the PIN or login information, and stored biometric information provided to the system during initial configuration. The monitoring system may generate an alarm to the security administrator associated with the monitoring property when the system cannot verify the biometrics information captured at the time of entering the PIN or login information. For example, the monitoring system may generate a text alert to a store manager of a retail store if an unauthorized employee enters a PIN code to disarm the monitoring system. The monitoring system may be configured to identify one or more PIN codes and or login information that generate alert conditions frequently, due to failure to provide the associated biometrics information at the time of PIN entry. The identified PIN codes and or login information are shut down by the system and the users associated with the identified PINS may be altered.

Figure 1:
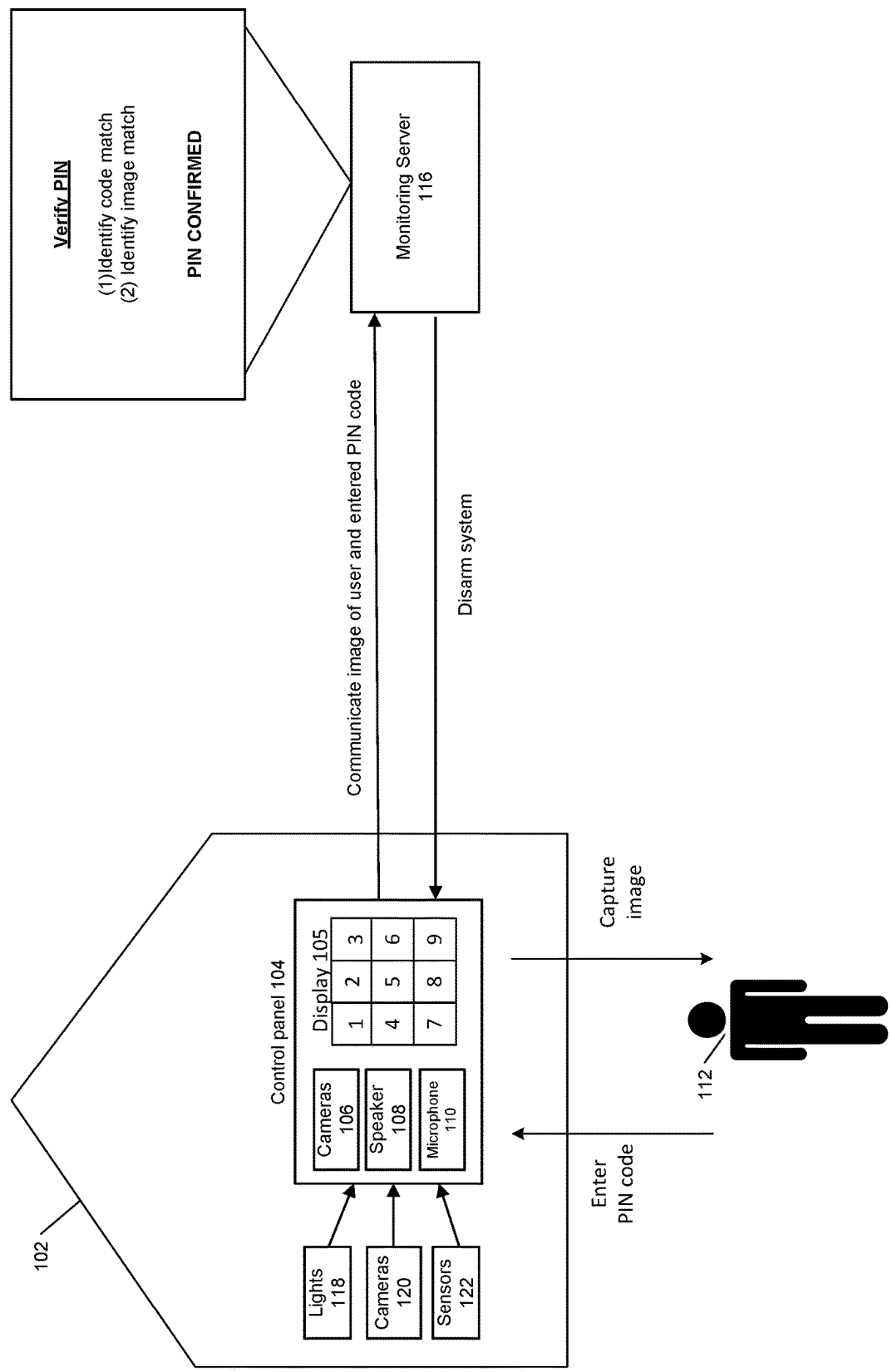
FIG. 1 illustrates an example of disarming a monitoring system at a monitored property based on verifying a user PIN code using biometrics data.

FIG. 1 illustrates an example of disarming a monitoring system at a monitored property 102 based on verifying a user PIN code using biometrics data. As shown in FIG. 1, a property 102 (e.g., a home) of a user 112 is monitored by an in-home monitoring system (e.g., in-home security system) that includes components that are fixed within the property 102. The in-home monitoring system may include a control panel 104, one or more cameras 120, one or more sensors 122, and one or more lights 118. The one or more cameras 120 may be video cameras that are located throughout the monitored property. The one or more sensors 122 may be any type of electronic sensors and may located throughout the monitored property 102. The monitored property 102 may include one or more other smart sensors, such as, doorbell camera, and smart locks.

The control panel 104 is the controlling component of the monitoring system, and is configured to receive data from the one or more devices throughout the monitored property 102. The control panel 104 communicates over a short-range wired or wireless connection with each of the one or more lights 118, one or more cameras 120, and one or more sensors 122, to receive sensor data descriptive of events detected by the one or more lights 118, one or more cameras 120, and one or more sensors 122. The control panel 104 also communicates over a long-range wired or wireless connection with a monitoring server 116. The monitoring server 116 is located remote from the property 102 and manages the in-home monitoring system at the property 102, as well as other (and, perhaps, many more) in-home monitoring systems located at different properties that are owned by different users. In some implementations, the monitoring server 116 may be located locally at the monitored property 102. The monitoring server 116 receives, from the control panel 104, sensor data descriptive of events detected by the sensors included in the in-home monitoring system of the property 102. The control panel 104 interface includes a camera 106, a speaker 108, and a microphone 110. The control panel 104 includes a display 105 that is configured to receive a PIN input from a user. The control panel 104 may include physical buttons, or in some examples may include a touch screen display. In some implementations, the monitoring server 116 may partially or completely operate outside the property 102. For example, the monitoring server 116 may reside on a central monitoring station that communicates with one or more other in-home monitoring systems. In other examples, the monitoring server may be located on another remote server other than a central monitoring station that exchanges data with the monitoring server 116 and the control panel 104 through another cloud network.

As illustrated in FIG. 1, a user 112 may wish to disarm the monitoring system at a monitored property 102. The user 112 enters a PIN code into the display 105 of the control panel 104. The PIN code may be a four-digit numerical code that the user 112 enters manually by pressing physical buttons on the display 105 of the control panel 104. The PIN code, in some examples, may be an alphanumeric code that the user enters into the display 105 of the control panel 104. The control panel 104 includes a camera 106 on the face of the control panel 104, and is configured to capture an image of a user as the user enters the PIN code into the display 105. The camera 106 may be configured to capture one or more images of the user 112 as the user enters the PIN code. In some implementations, the camera 106 may be configured to capture video recordings for the period of time as the user enters the PIN code. For example, the camera 106 may start capturing video recordings as the user enters the first digit of the PIN code until the user enters the last digit of the PIN code.

In some implementations, the control panel 104 may be configured to receive one or more types of biometric data from the user 112. For example, the control panel 104 may be configured to receive retinal scan data from a user entering a PIN code. In these examples, the control panel 104 may include a retina scanner on its front face at a location that aligns with the height of an average individual. The retinal scanner may be configured to capture a retinal scan as the user enters a PIN code into the display 105 of the control panel 104. The control panel 104 may prompt the user to look at the retinal scanner on the face of the control panel while entering the PIN. In another example, the control panel 104 may be configured to receiver finger print scans from a user entering a PIN code. The control panel 104 may include a finger print reader on its front face. The control panel 104 may prompt the user to enter the PIN code with one hand while placing a finger from the second hand on the finger print reader to capture a finger print scan. In some examples, the display 105 of the control panel 104 may be configured to capture a finger print scan as the user users his finger to enter the PIN code. The control panel 104 may be configured to respond to voice commands. For example, the user 112 may speak a PIN code into the microphone 110 of the control panel 104. The camera 106 of the control panel 104 may capture one or more images of the user 112 as the user speaks the PIN code into the microphone of the control panel 104.

For the example illustrated in FIG. 1, the control panel 104 communicates the one or more captured images of the user 112 and the PIN code entered by the user to the monitoring server 116. The control panel 114 communicates over a long-range wired or wireless connection with a monitoring server 116. The monitoring server 116 may be located remote from the property 102, and manages the in-home monitoring system at the property 102, as well as other (and, perhaps, many more) in-home monitoring systems located at different properties that are owned by different users. The monitoring server 116 may store at one or more databases associated with the server 116, the PIN codes selected by the one or more users associated with the monitored property 102. Each of the one or more users associated with the monitored property 102 may select a personal PIN code at the initial set up of the monitoring system. At the initial configuration for in-home monitoring system, the control panel 104 prompts each of the users to set up a personal PIN, and captures biometric information from the user as the user enters their PIN into the control panel 104. For example, as the user enters a selected code into the display 105 of the control panel 104, the camera 106 captures one or more images of the user. In some examples, the control panel 104 may capture one form of biometrics data from the user, while in other examples, the control panel 104 may capture several forms of biometrics data from the user. For example, as the user enters a selected code into the display 105 of the control panel 104, the camera 106 captures one or more images of the user, and a retina scanner captures one or more retinal scans from the user.

The monitoring server 116 receives the communicated PIN code and the one or more captured images of the user 112 from the control panel 104, and compares the received data to the stored data associated with the received PIN code. For example, the monitoring server 116 uses comparative facial recognition software algorithms to compare the received images of the user 112 to the images associated with the entered PIN. In some implementations, the comparison of the received images to the images associated with the PIN may be executed by the control panel 104. In other implementations, the comparison of the received images to the images associated with the PIN may be executed partially by the control panel 104 and partially by the monitoring server. The monitoring server 116 verifies that the images of the user that entered the PIN code are a successful match to the one or more images associated with the PIN code. Based on verifying the PIN and the successful match of the images, the monitoring server 116 commands the control panel 104 to disarm the monitoring system. The monitoring server 116 may use one or more techniques to identify a match between the one or more images associated with the PIN and the one or more received images. For example, the monitoring server 116 may use light reflection analysis techniques to investigate the light reflected off the object in focus.

In some implementations, the user 112 may use a mobile device or key fob that transmits a beacon to the control panel 104. The beacon may include the PIN, thus eliminating the need of the user 112 to key in the PIN. The mobile device or key fob may receive instructions that include the PIN from a similar system that provides the PIN to the user 112 in other implementations described above and below. In instances where the mobile device or key fob includes the PIN, the user 112 may not be aware of the PIN, which may change each day or may be different for different properties. The control panel 104 may receive the beacon and decode the PIN. The control panel 104 may compare the PIN to a stored PIN. The control panel 104 may request that the user 112 provide a biometric identifier. For example, the control panel 104 may instruct the user 112 to step in front of the control panel 104 to scan the user's 112 retina. As another example, the control panel 104 may automatically capture an image of the user's 112 face using a camera. The camera may be a doorbell camera or another type of camera. The control panel 104 analyzes the biometric identifier in a similar fashion to those techniques described above and below.

Figure 2:
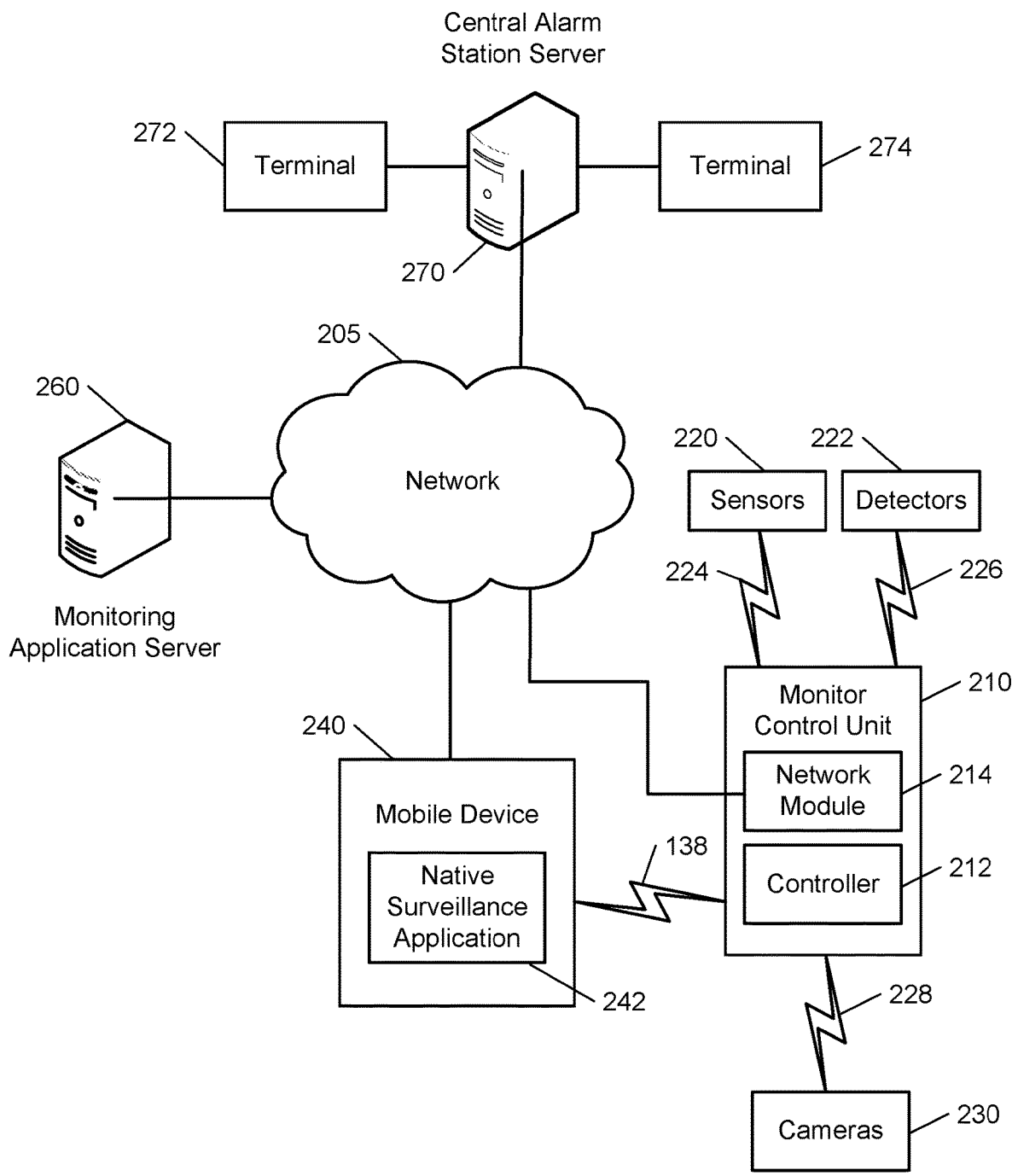
FIG. 2 illustrates an example monitoring system.

FIG. 2 illustrates an example of a system 200 configured to monitor a property and enable access to the property based on a verified technician identity. The system 200 includes a network 205, a monitoring system control unit 210, one or more user devices 240, a monitoring application server 260, a monitor control unit 210, and a central alarm station server 270. In some examples, the network 205 facilitates communications between the monitor control unit 210, the one or more user devices 240, the monitoring application server 260, and the central alarm station server 270.

The network 205 is configured to enable exchange of electronic communications between devices connected to the network 205. For example, the network 205 may be configured to enable exchange of electronic communications between the monitor control unit 210, the one or more user devices 240, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitor control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitor control unit 210 includes one or more sensors, one or more motion detectors, and one or more cameras. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The one or more cameras 230 may be triggered by several different types of techniques. For instance, a Passive Infra Red (PIR) motion sensor may be built into the one or more cameras 230 and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The sensors 220, the detectors 222, and the cameras 230 communicate with the controller 212 over communication links 224, 226, and 228. The communication links 224, 226, and 228 may be a wired or wireless data pathway configured to transmit signals from the sensors 220, the detectors 222, and the cameras 230 to the controller 212. The sensors 220 and the cameras 230 may continuously transmit sensed values to the controller 212, periodically transmit sensed values to the controller 212, or transmit sensed values to the controller 212 in response to a change in a sensed value.

The communication link 228 over which the cameras 230 and the controller 212 communicate may include a local network. The cameras 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 240 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

The central alarm station server 270 is connected to multiple terminals 272 and 274. The terminals 272 and 274 may be used by operators to process alarm events. For example, the central alarm station server 270 may route alarm data to the terminals 272 and 274 to enable an operator to process the alarm data. The terminals 272 and 274 may include general-purpose computers (e.g., desktop personal computers, workstations, or laptop computers) that are configured to receive alarm data from a server in the central alarm station server 270 and render a display of information based on the alarm data. For instance, the controller 212 may control the network module 214 to transmit, to the central alarm station server 270, alarm data indicating that a sensor 220 detected a door opening when the monitoring system was armed. The central alarm station server 270 may receive the alarm data and route the alarm data to the terminal 272 for processing by an operator associated with the terminal 272. The terminal 272 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 272 and 274 may be mobile devices or devices designed for a specific function. Although FIG. 2 illustrates two terminals for brevity, actual implementations may include more (and, perhaps, many more) terminals.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as wifi, Bluetooth, zwave, zigbee, HomePlug (ethernet over powerline), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Figure 3:
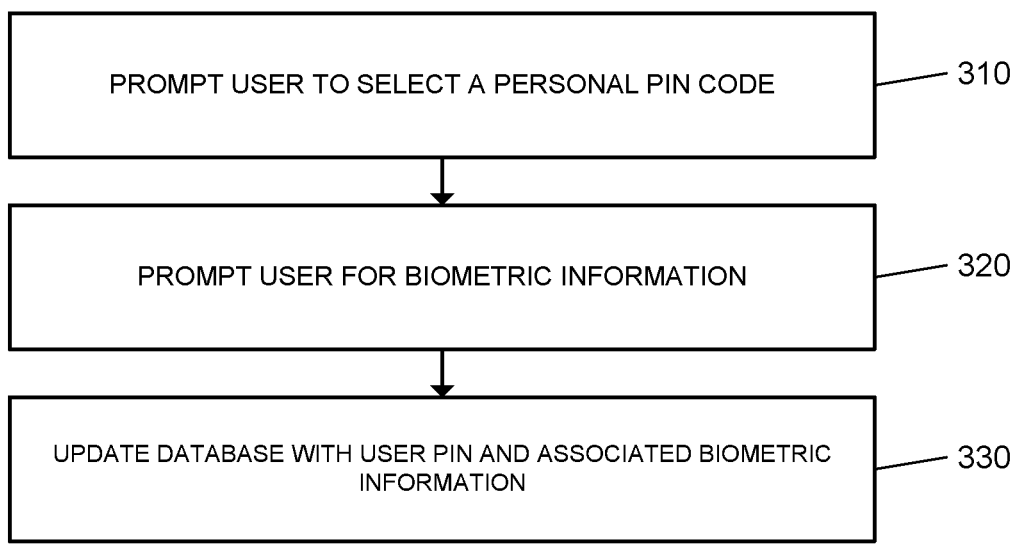
FIG. 3 is a flow chart of an example process for updating a login information database.

FIG. 3 is a flow chart of an example process for updating a login information database. The system prompts a user to select a personal PIN code (310). During the initial configuration of the monitoring system at the monitored property, one or more PIN codes and or logins are set up. The PIN code and the login information may be used by individuals associated with the monitored property to arm and or disarm the monitoring system. A user may use a control panel interface to set up a PIN or login. The control panel may prompt the user to select a four-digit PIN code. The user may enter the selected PIN by manually pressing the physical buttons on the control interface. The user, in some examples, may use a digital display to enter the desired PIN. In some examples, the control panel may prompt the user to select an alphanumeric string as a code. The user may use the controller interface to enter a user name and password to use as a login. In some implementations, a user may use a mobile device or computer to program the PIN and or log in information. In some examples, the control panel may include a voice interface that can be programmed by voice commands. The user may use voice commands to select a PIN and the control panel may record the user's voice. For example, the control panel may prompt the user to speak a particular word or phrase, and may record the user speaking the word or phrase.

The system prompts a user for biometric information (320). When the user enters the selected PIN code and or login information at the control panel, the control panel prompts the user to provide biometrics information. The biometrics information provided by a user acts as identifying information that is used by the system to confirm the user entering the PIN is in fact the user associated with the PIN.

In some examples, each of the one or more individuals associated with a monitored property each have a personally selected PIN code. For example, at a monitored home, a mother may select her PIN, a father may select his PIN, and each child may select his or her own PIN. In these examples, each of the one or more individuals may each set up a PIN and or login information individually, or alternatively, a single user may act as a security administrator and may set up temporary PIN and or login information for each other user. In some examples, a security administrator may select a PIN code to be used by one or more users at a monitored property. In these examples, at the time of initial system configuration, the security administrator may select a PIN and may also provide the cellular phone numbers of the one or more other users associated with the monitored property. The monitoring server may communicate a text message including a link, to the one or more mobile devices of the one or more other users. The one or more other users may access the link in the text message to provide the requested biometrics information. For example, the one or more other users may provide one or more "selfie" images, one or more voice recordings, and a finger print scan.

The security administrator may have access to a web based interface that allows the administrator to manage the use of the PIN by the one or more other users. The security administrator may be able to view the one or more images of the individuals associated with the PIN. The administrator may have the ability to suspend an individual user's use of the PIN for a specific time period, and or cancel the individuals access to use of the PIN. In some implementations, the security administrator may receive a periodic activity report which includes the date and time that each user used the PIN to either arm or disarm the system. The periodic activity report may also include the current list of users that are approved to use the PIN. The security administrator may use the web interface with the activity data to closely monitor the integrity of the monitoring system.

The control panel may prompt the user to provide one or more types of biometric information. For example, the control panel may prompt the user to provide one or more images, retinal scans, one or more voice records, and finger print scans. The control panel may prompt the user to provide a subset of the different types of biometrics information based on the compatibility of the control panel. For example, a model of a control panel may be configured to receive images and voice commands from a user but may not be configured to receive finger print scans.

When the control panel requests image information from the user, the user may be instructed to face the front surface of the control panel, and the camera of the control panel captures one or more images of the user. When the control panel requests retinal scanning information from the user, the user may be instructed to face the front surface of the control panel, and the scanner of the control panel captures one or more retinal scans. The control panel may prompt the user to provide a finger print scan, the user may be instructed to place a specific finger on the scanner portion of the controller interface to capture one or more finger print scans of the user finger. In some examples, where the control panel is configured to accept voice input for PIN code entry, the control panel may request one or more voice recordings from the user. For example, the control panel may prompt the user to speak a particular word or phrase while facing the speaker portion of the control panel interface.

The user may use a web browser or a mobile interface on a user device to set up a PIN or login. In the examples where a user uses a mobile device to set up a PIN or login information, the user may use the camera on the mobile device to capture one or more images. The user may provide finger print and or retinal scans when using a mobile device that is configure to capture such scans. The biometrics data and the selected PIN received from the user through the mobile device is then communicated to the monitoring server.

In some examples, each of the one or more users associated with the monitored property may set up a PIN code to arm and disarm the monitoring system. In these examples, during the initial configuration of the monitoring system, each of the users in turn may enter a selected PIN and provide biometric information at the control panel. Alternatively, in some implementations, a single user acting as a security administrator, may set up a PIN code biometrics information at the control panel. The user acting as the security administrator may provide a cellular phone number for each of the other user associated with the monitored property for whom a PIN will be configured. For example, a store manager at a monitored store may set up his PIN, and may provide the control panel with the cellular phone numbers of three other store workers. In these implementations, the control panel communicates the received one or more cellular phone numbers to the monitoring server, and the monitoring server in turn communicates a text message notification to each of the received cellular phone numbers. The text message notification may include a link to a secured webpage where the user can provide a selected PIN and or login information, and also provide the requested biometrics information. For example, the user may provide one or more "selfie" images captured from the mobile device.

In some implementations, the user acting as the security administrator may set up a temporary mobile login or web login for each of the other user associated with the monitored property. For example, a father at a monitored home may set up a temporary mobile login for his wife and son. The monitoring server communicates an email to each of the users with a temporary login and prompts the user to update the temporary login before a set expiration date. The user may access a link in the email to change their login information and provide biometric information. The user may access the email through a mobile device or a computer interface, and provide the required biometrics information. For example, the computer may capture one or more images of the user as the user selects login information while sitting in front of the screen.

The monitoring server updates a database with the user selected PIN and associated biometrics information received (330). The control panel communicates the user selected PIN and or login information along with the one or more forms of biometrics information received from the user. For example, the control panel may communicate the selected PIN, the one or more images, and the one or more voice recordings to the monitoring server. The monitoring server stores the received PIN code and/or login information and the associated biometrics data. The monitoring server may encrypt the biometrics data to ensure that the data is secured. For example, the monitoring server may encrypt the one or more voice recordings received from the user.

Figure 4:
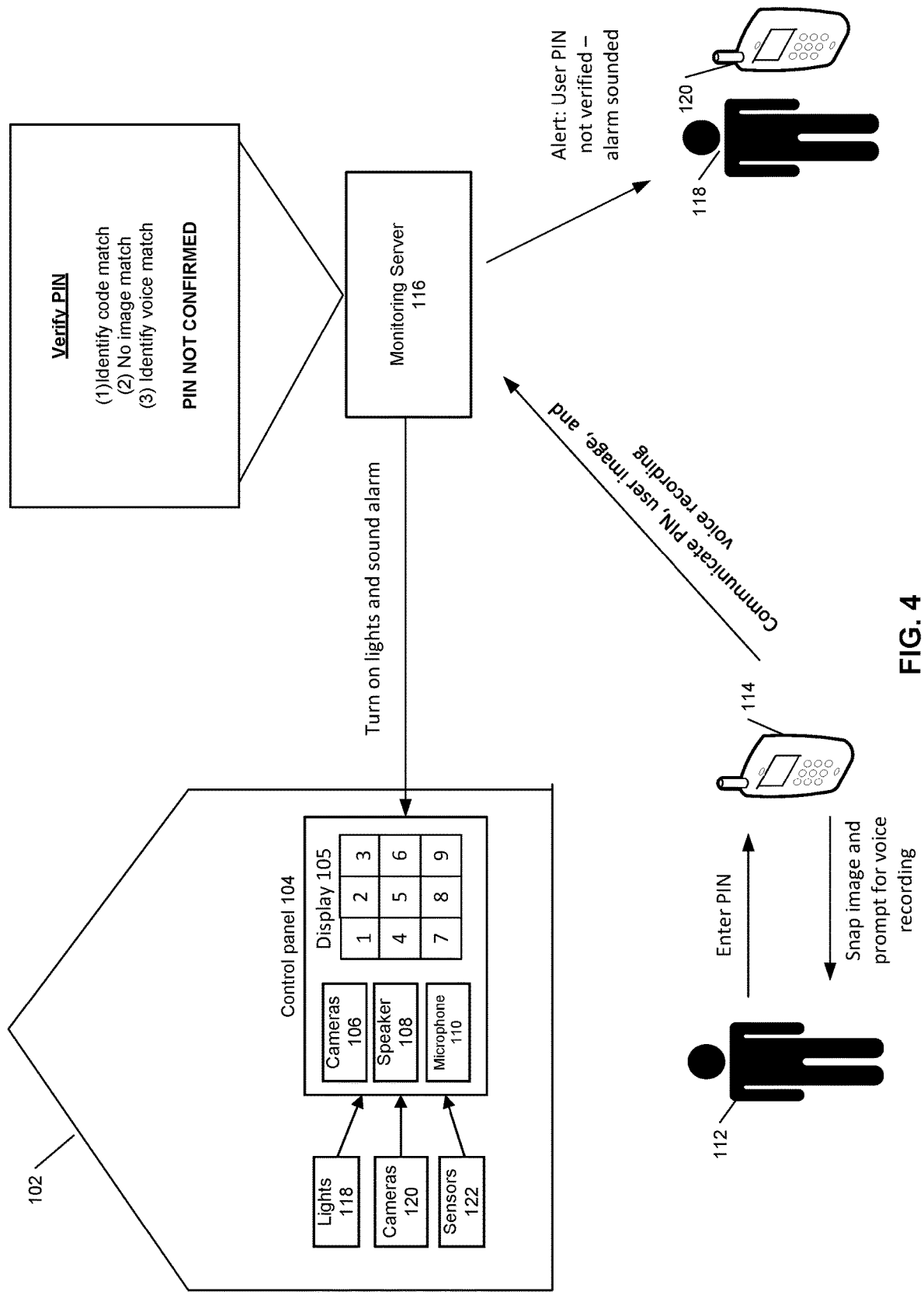
FIG. 4 illustrates an example of denying access to disarm the monitoring system at the monitored property.

FIG. 4 illustrates an example of denying access to disarm the monitoring system at the monitored property. As illustrated in FIG. 4, a user 112 may wish to disarm the monitoring system at the monitored property 102 using a mobile device 114. The mobile device may be configured to provide a web interface of a secured website for the in-home monitoring system. The user 112 may enter a PIN code into the web interface on the mobile device 114. The PIN code may be a four-digit numerical code, or may be an alphanumeric code. In some implementations, the user may provide a login user name and password on a web interface instead of user a PIN code. In some examples, the mobile interface for the in-home monitoring system may be hosted on the mobile device as an application. When the user 112 enters the PIN and or login information, and selects the disarm command, the camera of the mobile device 114 is prompted to capture one or more images of the user. For example, the user may enter a PIN code and the front camera of the mobile device 114 captures one or more "selfie" images of the user 112.

For the example illustrated in FIG. 4, the monitoring system may require one or more forms of biometrics data confirmation to arm and or disarm the system. As such, the web interface may prompt the user 112 to provide a voice recording in addition to the one or more images. The user 112 may speak into the speaker of the user device 114 to provide the voice recording. For example, the monitoring server may prompt the user to speak a particular word or phrase. In some examples, the system may require the user provide a finger print scan. For example, the user may provide a finger print scan through the application using a mobile device configured to perform such scans.

The mobile device 114 communicates the PIN or login information, the one or more images of the user 114, and voice recording to the monitoring server 116. The monitoring server 116 may store at one or more databases associated with the server 116, the PIN codes and login information associated with the one or more users associated with the monitored property 102. Each of the one or more users associated with the monitored property 102 may select a personal PIN code at the initial configuration of the monitoring system. At the initial configuration for in-home monitoring system, the control panel 104 prompts each of the users to set up a personal PIN, and captures biometric information from the user as the user enters their PIN into the control panel 104. For example, as the user enters a selected code into the display 105 of the control panel 104, the camera 106 captures one or more images of the user. In some examples, the control panel 104 may capture one form of biometrics data from the user, while in other examples, the control panel 104 may capture several forms of biometrics data from the user. For example, as the user enters a selected code into the display 105 of the control panel 104, the camera 106 captures one or more images of the user, and a retina scanner captures one or more retinal scans from the user.

The monitoring server 116 receives the communicated PIN code, the one or more captured images of the user 112, the voice recording, and compares the received data to stored data associated with the received code. The monitoring server 116 may use facial recognition software algorithms to compare the received images of the user 112 to the images associated with the entered PIN. In some implementations, the comparison of the images may be executed by the mobile device. In these implementations, the monitoring server may communicate an encrypted version of the one or more images to the mobile device 114. The encrypted version of the images may be temporarily decrypted to allow for comparison by the mobile device 114. The monitoring server 116 may use voice recognition software algorithms to compare the received voice recording to the one or more stored voice recordings associated with the entered PIN.

The monitoring server 116 verifies that the received voice recording matches the voice of the user associated with the entered PIN, but the one or more images of the user do not match the stored images. Based on identifying a successful match of the voice recording and no image match, the monitoring system 116 detects an integrity validation fault condition (IVFC). The integrity validation fault condition (IVFC) may cause an alert to be generated. The generated alert may be communicated to a central alarm station server. The monitoring server 116 commands the control panel 104 to turn on one or more lights and sound the alarm at the monitored property 102. The monitoring server 116 generates an alarm notification to the mobile device 120 of the user 118 associated with the monitored property. The user 118 may be a security administrator associated with the monitored property 102. The generated alert may be sent as a text message to the mobile device 120 of the user 118. The alert may include the description of the alarm event and the actions taken by the monitoring server 116. For example, the alert may indicate there was not an image match and the light at the property have been turned on and the alarmed sounded.

In some examples, the monitoring server may 116 may command the control panel 104 to sound voice instructions instructing the user 112 to go to the control panel 104 to have an image of the user captured. The user 112 may face the control panel 104 and have an image captured. If the identity of the user 112 is confirmed based on the captured image, the control panel will end the alarm event.

Figure 5:
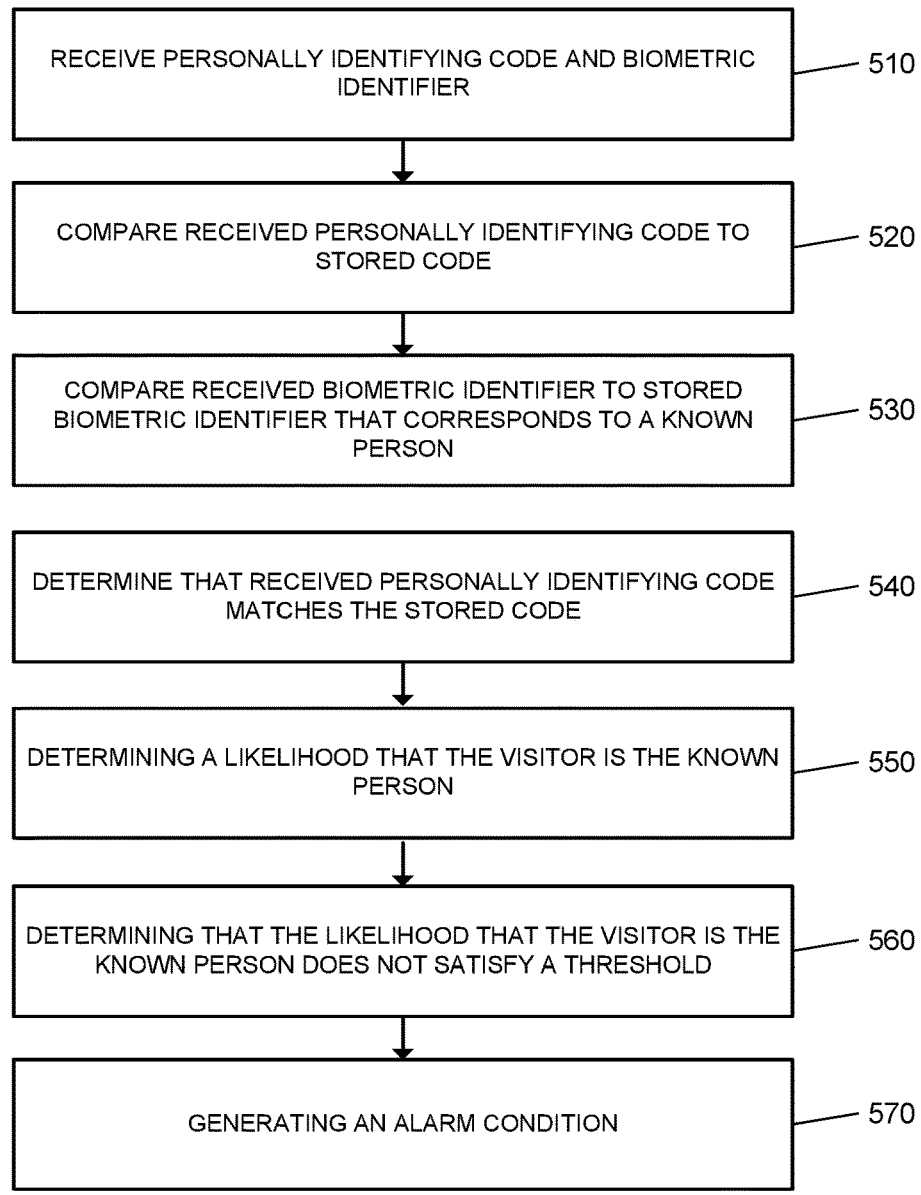
FIG. 5 is a flow chart of an example process for generating an alarm condition at a monitored property.

FIG. 5 is a flow chart of an example process for generating an alarm condition at a monitored property. The monitoring server receives a personally identifying code and a biometric identifier (510). A visitor arriving at the monitored property may provide the personally identifying code and the biometric identifier to disarm the monitoring system at the monitored property. The visitor wishing to gain access to the monitored property may provide the personally identifying code into a display of a control panel of the monitoring system. The personally identifying code may be a four-digit PIN code or may be an alphanumeric code. Personally identifying codes may be assigned to one or more users associated with the monitored property with the assigned code being unique for each user. When the visitor enters the personally identifying code to disarm the monitoring system, the control panel may automatically prompt the visitor to provide a biometric identifier. For example, the control panel may generate an audible message prompting the visitor to face the control panel and to provide a retina scan. In some examples, the control panel may automatically capture the biometric identifier while the user is entering their personally identifying code. For example, the control panel may capture one or more images of the visitor as the visitor enters their personally identifying code into the display of the control panel. In some examples, the monitoring server may be a server that is remote from a monitored property, and is in communication with a control panel that controls the monitoring system at a monitored property. In these examples, the control panel receives the personally identifying code and the biometric identifier, and communicates the received data to the monitoring server.

The monitoring server compares the received personally identifying code to a stored personally identifying code (520). During the initial set up of the monitoring system at the monitored property, a resident user may configure one or more personally identifying codes that may be used to disarm the monitoring system. The one or more personally identifying codes are each unique to a particular user, and are used to disarm the monitoring system along with one or more biometric identifiers associated with each user. During configuration of each personally identifying code, the system may prompt the associated user to provide biometric data. For example, Ken may configure his personally identifying code as 1234, and may provide the control panel with one or more images of himself, a retina scan, one or more finger prints, a voice recording, or any other suitable biometric identifier. In some implementations, the system may prompt the user for one biometric identifier, in other implementations, the system may prompt the user for various different biometric identifiers.

The control panel communicates the configured personally identifying code and the captured biometric data to the monitoring server. Each of the one or more configured personally identifying codes and the associated captured biometric data are stored in memory at the monitoring server. The monitoring server compares the received biometric identifier to a stored biometric identifier that corresponds to a known person (530). For example, a visitor may provide their finger print at the control panel, and the monitoring server compares the received finger print data to the one or more stored biometric identifiers. In some implementations, the monitoring server verifies the personally identifying code, and based on the personally identifying code matching a stored code, then compares the biometric data associated with the stored personally identifying code to the received biometric data. In these implementations, the system does not attempt to compare the biometric data when the personally identifying code received does not match a stored code. In other implementations, the monitoring server attempts to verify the personally identifying code and the biometric identifier simultaneously.

The monitoring server determines that the received personally identifying code matches the stored personally identifying code based on comparing the received personally identifying code to the stored personally identifying code (540). When the visitor enters their personally identifying code, the monitoring system compares the received code to the one or more stored personally identifying codes, and determines a match when the received code matches a personally identifying code stored in memory.

The monitoring server determines a likelihood that the visitor is the known person based on comparing the received biometric identifier to the stored biometric identifier (550). In some implementations, the monitoring server captures biometric data from the visitor only after the personally identifying code received by the visitor matches a stored personally identifying code. In these implementations, when the received personally identifying code matches a stored code, the monitoring system, verifies whether the biometric identifier received matches the stored one or more biometric identifiers associated with the received personally identifying code. For example, the monitoring server may compare the received retina scan biometric identifier to the stored retina scan biometric data. The monitoring server may determine a likelihood that the visitor is a known person based on the comparison of the received biometric identifier, and may also determine a confidence score for the determined likelihood. For example, the confidence score of the likelihood that the visitor is a known person may be determined to be 60%.

The monitoring server determines that the likelihood that the visitor is the known person does not satisfy a threshold (560). The monitoring server may compare the determined confidence score to a confidence score threshold. For example, the monitoring server determines that the likelihood that the visitor is the known person to be 45% and does not satisfy the threshold confidence score of 75%. The threshold confidence score may change based on the armed status of the monitoring system at the monitored property. When the monitoring system is armed away, the monitoring server assumes that the residents of the property are not present at the property. Based on the monitoring server assuming that residents are not at the property, the monitoring server increases the confidence score threshold required to determine when a visitor is a known person. The monitoring server increases the confidence score threshold to ensure that the monitoring system is not disarmed by an unknown person. For example, when the monitoring system is armed away, the confidence threshold score may be set to 90%. When the monitoring system is armed stay, the monitoring server assumes that the residents of the property are within the property. Based on the monitoring server assuming that the residents are within the property, the monitoring server decreases the confidence score threshold required to determine when a visitor is a known person. For example, when the monitoring system is armed stay, the confidence threshold score may be decreased to 70%.

The monitoring server generates an alarm condition based on determining that the likelihood that the visitor is the known person does not satisfy the threshold, and based on determining that the received personally identifying code matches the stored personally identifying code (570). The monitoring server communicates the alarm condition to the control panel at the monitored property. In some implementations, the alarm condition generated is based on the armed status of the monitoring system at the property. For example, when the monitoring system is armed away, the monitoring server may sound an audible alarm at the property, and when the monitoring system is armed stay, the monitoring server may communicate a notification to a resident user. In some examples, the monitoring server may communicate with an external server to request law enforcement is dispatched to the monitored property.

As mentioned above, personally identifying codes may be assigned to one or more residents of the monitored property with each assigned code being unique to the resident. An administrative resident that manages the monitoring system at the monitored property may enroll each of the one or more other residents into the system. For example, Tom may be the administrative resident at a monitored property, and may configure a personally identifying code for himself, a personally identifying code for his wife Jane, and a personally identifying code for their son Tim. During configuration of the system, the administrative resident firstly configures a master code that is used by the administrative resident to add the one or more personally identifying codes for the residents of the monitored property. The master code may be a four-digit PIN code or an alpha-numeric code.

When the administrative resident wishes to configure a new personally identifying code for a resident, the administrative resident first enters the master code and provides their biometric data. The monitoring system compares the received code to a stored code to verify the code entered by the administrative resident, and compares the received biometric data to the stored biometric data of the administrative resident. When the administrate resident is verified, the system allows the resident to add one or more new personally identifying codes. In some examples, the master code may be used by the administrative resident as their personally identifying code to disarm the monitoring system. In other examples, the master code is only used by the administrative resident when the resident is configuring a new personally identifying code. In these examples, the administrative resident may have a personally identifying code which is used to disarm the monitoring system and that is different from the master code.

In some implementations, the administrative resident may wish to configure personally identifying codes for regular visitors to the monitored property. In these implementations, the administrative resident may add one or more personally identifying codes for other users associated with the monitored property. For example, the administrative resident may configure personally identifying codes for a nanny, a neighbor, a plumber, or a dog walker.

In some implementations, the monitoring server may receive sensor data from one or more sensors, and may adjust the confidence score threshold value based on the received sensor data. For example, when a visitor arrives at the monitored property, a motion sensor near the front door of the property may detect motion, and communicate the sensor data to the monitoring server. When the motion sensor is triggered, the monitoring server may command one or more cameras near the sensor to begin to capture video data. The one or more cameras may communicate the video data to the monitoring server, and the server may compare the captured images of the visitor to the one or more stored images. Based on the monitoring server detecting motion, and identifying a match between the image of the visitor and one or more stored images, the monitoring server decreases the confidence threshold value. For another example, when a visitor arrives at the monitored property, a PIR light sensor, which is configured to distinguish between a human and an animal form within the field of view of a camera with a PIR sensor, may determine that the human visitor is accompanied by an animal. The monitoring server may assume the visitor is the dog walker arriving at the property since the system determines that the dog walker usually arrives at the monitored property with another dog. Based on the monitoring server receiving the personally identifying code associated with the dog walker and confirming the visitor has an animal companion, the server may decrease the confidence score threshold.

The monitoring server may lower the confidence score threshold based on the system expecting a visitor at the property. For example, the system may determine that the dog walker usually takes an hour to walk the resident dog, when the dog walker initially arrives at the monitored property and disarms the system, the monitoring system may determine a return time based on the dog walker arrival time. The monitoring server may decrease the confidence score threshold when a visitor arrives at the property an hour after the dog walker's initial arrival. In some examples, the monitoring server may receive location data associated with each of the one or more residents. The location data may be received automatically from the resident's mobile device when the resident is within a particular distance from the monitored property. The monitoring server may decrease the confidence score threshold when the received location data indicates that the resident is near or inside the monitored property.

In some implementations, the monitoring system may increase the confidence threshold when a visitor exceeds a predetermined visitor allowance number. The administrative resident may assign a visitor allowance number to each configured personally identifying code. The visitor allowance number indicates the number of persons that are allowed to accompany a particular visitor when the visitor's personally identifying code is used to disarm the monitoring system. For example, the administrator resident may have an unlimited visitor allowance, and a child resident have zero. When a visitor enters their personally identifying code, the monitoring server may prompt one or more cameras near the control panel to capture images of the area. Based on the captured images, the monitoring server determines the number of persons accompanying the visitor, and compares the number of persons to the visitor allowance number associated with the received personally identifying code. The monitoring server may prevent access to the monitored property based on the number of persons arriving at the property exceeding the visitor allowance number associated with the personally identifying code used to disarm the system. In some implementations, the monitoring server may send a notification to the administrative resident notifying that a visitor has exceeded their visitor allowance. In these implementations, the resident administrator may respond to the notification by requesting the monitoring server allow the visitor access to the monitored property. In some implementations, the monitoring sever may generate an alarm when the visitor exceeds the visitor allowance.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system comprising one or more computers and one or more storage devices on which are stored instructions that are operable, when executed by the one or more computers, to cause the one or more computers to perform operations comprising:
   receive biometric data of a visitor to a property captured by sensors configured to monitor the property;
   determine, from the biometric data, a biometric identifier for the visitor to the property;
   determine a confidence score that reflects a likelihood that the visitor is authorized based on the biometric identifier;
   maintain a threshold confidence score for the monitoring system;
   adjust the threshold confidence score using sensor data indicating a current status of a plurality of statuses related to the monitoring system from one or more sensors configured to capture the sensor data of the monitoring system of the property or a time at which the visitor is attempting to visit the property, wherein a type of adjustment of the threshold confidence score depends in part on the current status of the plurality of statuses or the time at which the visitor is attempting to visit the property and the type of adjustment of the threshold confidence score would be different given a different status from the plurality of statuses or a different time at which the visitor is attempting to visit the property;
   compare the confidence score that reflects the likelihood that the visitor is authorized to the adjusted threshold confidence score;
   using a result of the comparison of the confidence score that reflects the likelihood that the visitor is authorized to the adjusted threshold confidence score, determine that the confidence score satisfies the adjusted threshold confidence score; and
   based on the determination that the likelihood that the confidence score satisfies the adjusted threshold confidence score, allow the visitor to access the property.

2. The monitoring system of claim 1, wherein adjusting the threshold confidence score using the sensor data indicating the current status of the plurality of statuses related to the monitoring system or the time at which the visitor is attempting to visit the property comprises:
   determining, using the sensor data, a status of the plurality of statuses related to the monitoring system; and
   adjusting the threshold confidence score based on the status related to the monitoring system.

3. The monitoring system of claim 2,
   wherein determining the status of the plurality of statuses related to the monitoring system comprises determining, using the sensor data, that the status of the monitoring system is armed stay; and
   wherein adjusting the threshold confidence score using the sensor data indicating the current status related to the monitoring system comprises decreasing the threshold confidence score based on the determination that the monitoring system is armed stay.

4. The monitoring system of claim 2,
   wherein determining the status of the plurality of statuses related to the monitoring system comprises determining, using the sensor data, that the status of the monitoring system is armed away; and
   wherein adjusting the threshold confidence score using the sensor data indicating the current status related to the monitoring system comprises increasing the threshold confidence score based on the determination that the monitoring system is armed away.

5. The monitoring system of claim 2,
   wherein determining the status of the plurality of statuses related to the monitoring system comprises detecting, using the sensor data, motion at the property and identifying a match between an image of the visitor and one or more stored images; and
   wherein adjusting the threshold confidence score using the sensor data indicating the current status related to the monitoring system comprises decreasing the threshold confidence score based on the detected motion and the identified match between the image of the visitor and the one or more stored images.

6. The monitoring system of claim 2,
   wherein determining the status of the plurality of statuses related to the monitoring system comprises determining that the visitor is accompanied by an animal; and
   wherein adjusting the threshold confidence score using sensor data indicating the current status related to the monitoring system comprises decreasing the threshold confidence score based on the determination that the visitor is accompanied by the animal.

7. The monitoring system of claim 2,
   wherein determining, using the sensor data, the status of the plurality of statuses related to the monitoring system comprises determining location data associated with one or more residents of the property; and
   wherein adjusting the threshold confidence score using sensor data indicating the current status related to the monitoring system comprises adjusting the threshold confidence score using the location data associated with the one or more residents of the property.

8. The monitoring system of claim 2,
wherein determining, using the sensor data, the status of the plurality of statuses related to the monitoring system comprises determining, using the sensor data, that a number of persons accompanying the visitor exceeds a visitor allowance number; and
wherein adjusting the threshold confidence score using the sensor data indicating the current status related to the monitoring system comprises increasing the threshold confidence score based on the determination that the number of persons accompanying the visitor exceeds the visitor allowance number.

9. The monitoring system of claim 1, wherein adjusting the threshold confidence score using sensor data indicating the current status of the plurality of statuses related to the monitoring system or the time at which the visitor is attempting to visit the property comprises:
determining a time at which the visitor is attempting to visit the property; and
adjusting the threshold confidence score based on the time at which the visitor is attempting to visit the property.

10. The monitoring system of claim 9,
wherein determining the time at which the visitor is attempting to visit the property comprises determining a current time; and
wherein adjusting the threshold confidence score using sensor data indicating the time at which the visitor is attempting to visit the property comprises decreasing the threshold confidence score based on a determination that the current time corresponds to a time at which the visitor is expected to visit the property.

11. A method comprising:
receiving, by a monitoring system configured to monitor a property, biometric data of a visitor to the property captured by sensors configured to monitor the property;
determining, by the monitoring system and from the biometric data, a biometric identifier for the visitor to the property;
determining, by the monitoring system, a confidence score that reflects a likelihood that the visitor is authorized based on the biometric identifier;
maintaining a threshold confidence score for the monitoring system;
adjusting, by the monitoring system, the threshold confidence score using sensor data indicating a current status of a plurality of statuses related to the monitoring system from one or more sensors configured to capture the sensor data of the monitoring system of the property or a time at which the visitor is attempting to visit the property, wherein a type of adjustment of the threshold confidence score depends in part on the current status of the plurality of statuses or the time at which the visitor is attempting to visit the property and the type of adjustment of the threshold confidence score would be different given a different status from the plurality of statuses or a different time at which the visitor is attempting to visit the property;
comparing, by the monitoring system, the confidence score that reflects the likelihood that the visitor is authorized to the adjusted threshold confidence score;
using a result of the comparison of the confidence score that reflects the likelihood that the visitor is authorized to the adjusted threshold confidence score, determining, by the monitoring system, that the confidence score satisfies the adjusted threshold confidence score; and based on the determination that the likelihood that the confidence score satisfies the adjusted threshold confidence score, allowing, by the monitoring system, the visitor to access the property.

12. The method of claim 11, wherein adjusting the threshold confidence score using the sensor data indicating the current status of the plurality of statuses related to the monitoring system or the time at which the visitor is attempting to visit the property comprises:
determining, using the sensor data, a status of the plurality of statuses related to the monitoring system; and
adjusting the threshold confidence score based on the status related to the monitoring system.

13. The method of claim 12,
wherein determining the status of the plurality of statuses related to the monitoring system comprises determining, using the sensor data, that the status of the monitoring system is armed stay; and
wherein adjusting the threshold confidence score using the sensor data indicating the current status related to the monitoring system comprises decreasing the threshold confidence score based on the determination that the monitoring system is armed stay.

14. The method of claim 12,
wherein determining the status of the plurality of statuses related to the monitoring system comprises determining, using the sensor data, that the status of the monitoring system is armed away; and
wherein adjusting the threshold confidence score using the sensor data indicating the current status related to the monitoring system comprises increasing the threshold confidence score based on the determination that the monitoring system is armed away.

15. The method of claim 12,
wherein determining the status of the plurality of statuses related to the monitoring system comprises detecting, using the sensor data, motion at the property and identifying a match between an image of the visitor and one or more stored images; and
wherein adjusting the threshold confidence score using the sensor data indicating the current status related to the monitoring system comprises decreasing the threshold confidence score based on the detected motion and the identified match between the image of the visitor and the one or more stored images.

16. The method of claim 12,
wherein determining the status of the plurality of statuses related to the monitoring system comprises determining that the visitor is accompanied by an animal; and
wherein adjusting the threshold confidence score using sensor data indicating the current status related to the monitoring system comprises decreasing the threshold confidence score based on the determination that the visitor is accompanied by the animal.

17. The method of claim 12,
wherein determining, using the sensor data, the status of the plurality of statuses related to the monitoring system comprises determining location data associated with one or more residents of the property; and
wherein adjusting the threshold confidence score using sensor data indicating the current status related to the monitoring system comprises adjusting the threshold confidence score using the location data associated with the one or more residents of the property.

18. The method of claim 12,
wherein determining, using the sensor data, the status of the plurality of statuses related to the monitoring system comprises determining, using the sensor data, that a number of persons accompanying the visitor exceeds a visitor allowance number; and wherein adjusting the threshold confidence score using the sensor data indicating the current status related to the monitoring system comprises increasing the threshold confidence score based on the determination that the number of persons accompanying the visitor exceeds the visitor allowance number.

19. The method of claim 11, wherein adjusting the threshold confidence score using sensor data indicating the current status of the plurality of statuses related to the monitoring system or the time at which the visitor is attempting to visit the property comprises:

determining a time at which the visitor is attempting to visit the property; and adjusting the threshold confidence score based on the time at which the visitor is attempting to visit the property.

20. The method of claim 19, wherein determining the time at which the visitor is attempting to visit the property comprises determining a current time; and wherein adjusting the threshold confidence score using sensor data indicating the time at which the visitor is attempting to visit the property comprises decreasing the threshold confidence score based on a determination that the current time corresponds to a time at which the visitor is expected to visit the property.

* * * * *